Figure 10:
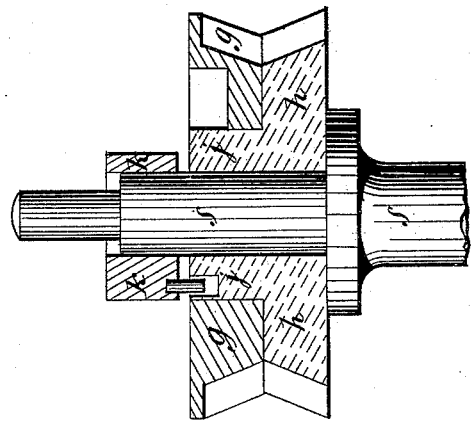

(No Model.) 4 Sheets—Sheet 1.
G. PALEY.
TRAVERSE BAR ACTUATING MECHANISM IN MACHINES FOR PREPARING AND SPINNING COTTON, &c.
No. 419,872. Patented Jan. 21, 1890.
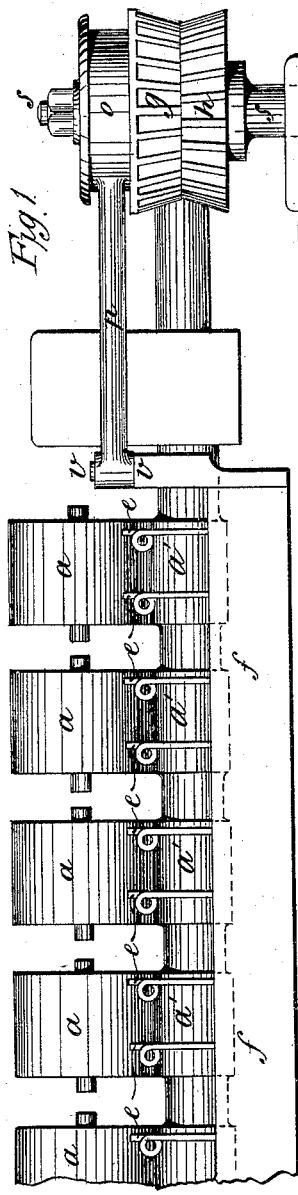
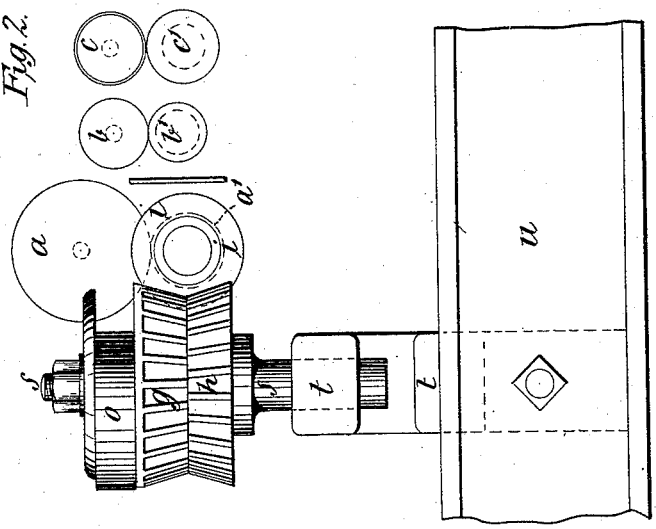
Witnesses.
James Whiteside
Yates W. Booth
Inventor.
George Paley
N. PETERS, Photo-Lithographer, Washington, D. C.

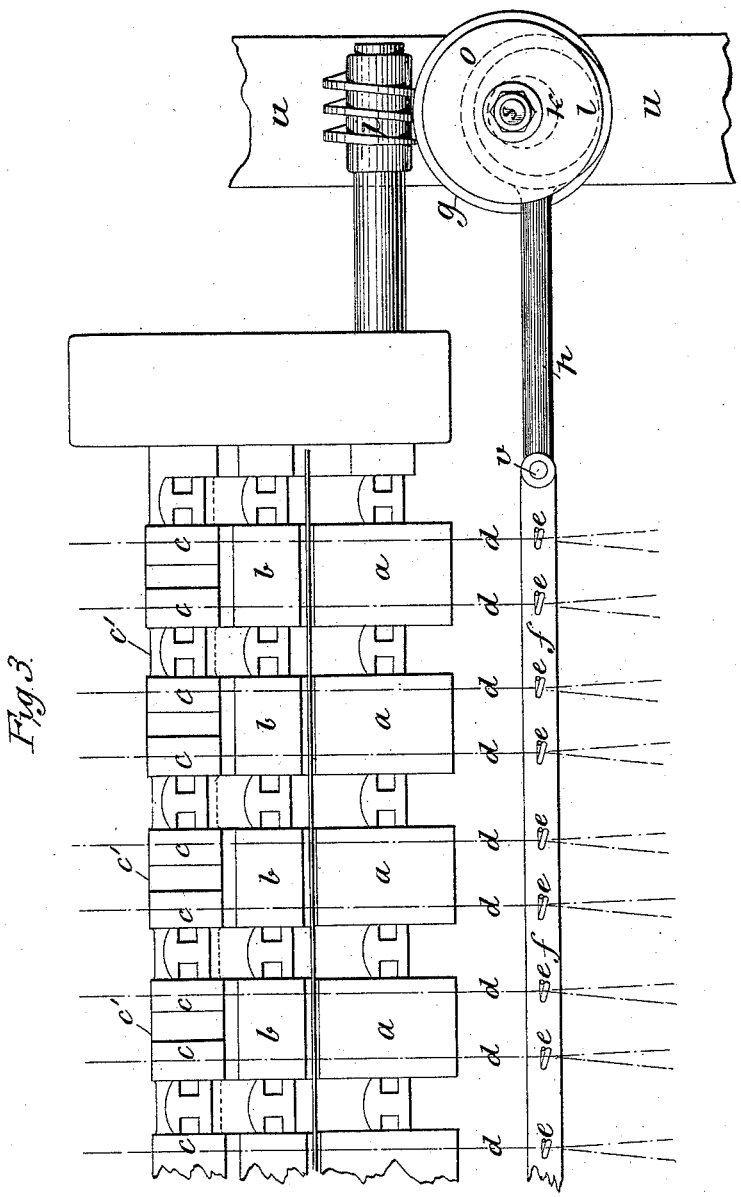

(No Model.) 4 Sheets—Sheet 3.
G. PALEY.
TRAVERSE BAR ACTUATING MECHANISM IN MACHINES FOR PREPARING AND SPINNING COTTON, &c.
No. 419,872. Patented Jan. 21, 1890.
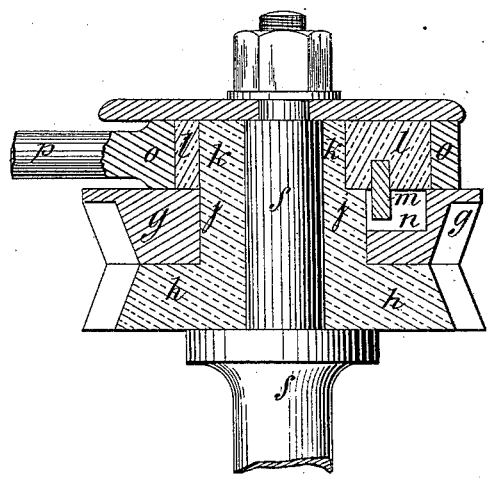
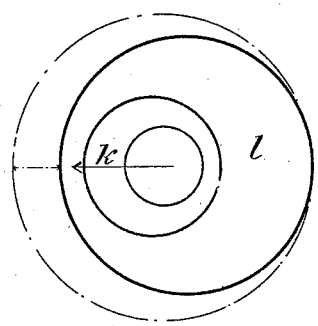
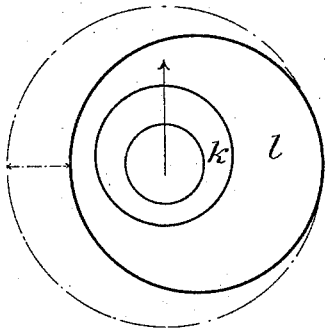
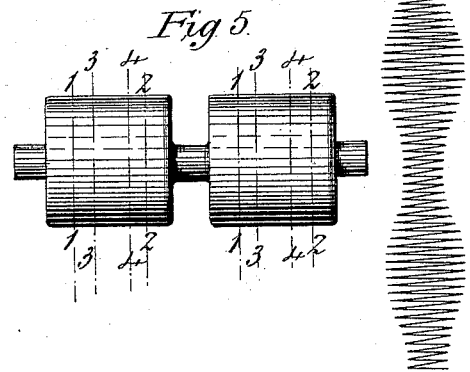
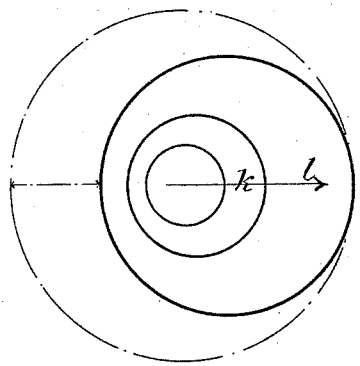
Witnesses
James Whiteside
Galli W. Booth
Inventor
George Paley (No Model.) 4 Sheets—Sheet 4.

G. PALEY.
TRAVERSE BAR ACTUATING MECHANISM IN MACHINES FOR PREPARING AND SPINNING COTTON, &c.

No. 419,872. Patented Jan. 21, 1890.

Witnesses.
E. C. Duffy
H. E. Peck

Inventor.
Geo. Paley
per W. E. Duffy, Atty

UNITED STATES PATENT OFFICE.

GEORGE PALEY, OF PRESTON, COUNTY OF LANCASTER, ENGLAND.

TRAVERSE-BAR-ACTUATING MECHANISM IN MACHINES FOR PREPARING AND SPINNING COTTON, &c.

SPECIFICATION forming part of Letters Patent No. 419,872, dated January 21, 1890.

Application filed June 18, 1889. Serial No. 314,764. (No model.)

*To all whom it may concern:*

Be it known that I, GEORGE PALEY, a subject of the Queen of Great Britain and Ireland, residing at Preston, in the county of Lancaster, England, have invented Improvements in Traverse-Bar-Actuating Mechanism in Machines for Preparing and Spinning Cotton and other Fibrous Materials, of which the following is a specification.

In machines for preparing and spinning cotton and other fibrous materials the sliver or "roving" is passed between upper and lower sets of drawing-rollers, the upper or "top" rollers being usually covered with leather or other suitable material. The sliver is guided to the rollers through holes or eyelets in or upon a horizontal sliding rod termed the "traverse-bar," which is caused to move slowly sidewise first in one direction and then in the other, so as to vary the path of the sliver between the adjoining faces of the rollers.

My invention is designed to occasion an automatic variation of the distance traveled by the traverse-bar at each succeeding to-and-fro sidewise movement, instead of causing it to move or travel continuously one uniform distance between two fixed points, which in practice results in the rollers (and more especially the top or leather-covered rollers) becoming indented or "nicked" at the two points on the face of the rollers corresponding with the commencement and finish of each sidewise journey of the traverse.

In carrying out my invention I employ an arrangement of toothed wheel and double eccentric mechanism which so operates that the distance of successive journeys of the traverse-bar is caused to be gradually shortened and lengthened out alternately. The said toothed wheel and eccentric mechanism is arranged as follows: A vertical stud fastened to the framing of the preparing or spinning machine forms the axis for a lower toothed wheel whose boss or hub projects upwardly and forms the bearing for a second or upper toothed wheel. The said boss or hub is continued upwardly concentric with its axis to a point on a level with the surface of the upper toothed wheel; but above the said wheel it is formed eccentrically and constitutes what is hereinafter termed the "inner eccentric."

The inner eccentric forms the bearing for a second or outer eccentric (driven or rotated by the upper toothed wheel) connected with the traverse-bar by means of an inclosing-hoop and a rod. The two eccentrics are preferably of different degrees of eccentricity. The two toothed wheels have an unequal number of teeth, and a worm fastened on the back roller-shaft gears into both wheels and simultaneously rotates them, but at unequal speeds by reason of their having an unequal number of teeth, as just stated. At each revolution of the wheels the position of the outer eccentric upon the inner eccentric will vary in a ratio corresponding with the difference in the number of the teeth of the two wheels, and as the inner eccentric forms the bearing of the outer eccentric it follows that the amount of "throw" of the outer eccentric will be increased or diminished in proportion as its center is moved to a position farther from or nearer to the axis of the stud around which the inner eccentric rotates.

In the accompanying drawings, Figure 1 is a back elevation, Fig. 2 an end elevation, and Fig. 3 a plan view, of my improved apparatus and so much of the roller mechanism of an ordinary form of spinning-mule as is necessary to illustrate the nature and application of my said invention. Fig. 4 is a sectional view, drawn to a larger scale, of the details of the toothed wheel and eccentric mechanism and attendant parts. Fig. 5 represents an ordinary form of leather-covered top roller, such as is commonly employed in spinning-machines, and the figure illustrates the limits within which I preferably arrange my improved variable traverse apparatus to guide the sliver. The points 1 and 2 correspond with the maximum distance and the points 3 and 4 with the minimum distance traveled by the traverse-bar. Figs. 6, 7, and 8 are diagram views showing the inner and outer eccentrics in varying relative positions to each other, the minimum throw of the outer eccentric being shown at Fig. 6 and its maximum throw at Fig. 8. Fig. 9 is another diagram view illustrating the variations imparted to the traverse-bar by the operation of the apparatus hereinabove described, and shown in the drawings, the traverse-bar reaching its extreme limits once in about twentyfive to-and-fro movements or journeys. Fig. 10 illustrates a modification of the apparatus above described, showing the inner eccentric in a loose piece separate or detachable from the hub or boss of the lower toothed wheel.

$aa$ and $bb$ are metal top rollers, $cc$ leather-covered top rollers, and $a'$ $a'$, $b'$ $b'$, and $c'$ $c'$ bottom fluted rollers, all of which are of the usual type. The sliver $d$ is guided to the back rollers $a$ and $a'$ through eyelets $e$ $e$ on the traverse-bar $f$, which may be mounted to slide horizontally in bearings of the usual or any convenient kind.

$g$ and $h$ are two toothed wheels mounted on the stud $s$, and rotated by the worm $i$, one of the wheels having preferably one more tooth than the other wheel. The lower wheel $h$ carries the cylindrical stem $j$, which forms the bearing for the upper wheel $g$, and (in Fig. 4 of the drawings) the upper part of the stem $j$ forms the inner eccentric $k$. The inner eccentric $k$ may, however, be made in a separate piece and removable, and be driven by the rotating stem $j$ on the wheel $h$ by means of a pin projecting downwardly from its under side into a vertical hole in the top of the said stem $j$. (See Fig. 10.) The outer eccentric $l$ is rotated around the inner eccentric $k$ by the upper wheel $g$, through the medium of the pin $m$, working in the radial slot $n$. When the inner eccentric is made in a separate or detached form and rotated by means of a pin, as above mentioned, either the inner or the outer eccentric, or both, may be readily removed and changed for other eccentrics similar in other respects, but having a greater or less degree of eccentricity, as the circumstances may require.

$o$ is the hoop or strap surrounding the outer eccentric $l$, forming one end of a connecting-rod $p$, which at its other end fits easily upon a pivot or pin $v$, fastened to the traverse-bar $f$.

The stud $s$ may be conveniently mounted in a bracket, such as $t$, fastened to the ordinary framing $u$ of the spinning-machine, the arrangement shown affording the required facilities for the adjustment of the apparatus.

It will be observed that the inner eccentric $k$ rotates around a fixed axis $s$, and therefore that the extent of its sweep or throw is constant. On the other hand, the outer eccentric $l$ not only rotates around the same fixed axis $s$ at each revolution of its driving-wheel, but also around a second or shifting axis—namely, the inner eccentric $k$—which forms its bearing, and thus it periodically makes a complete revolution round the inner eccentric in accordance with the difference of the speeds at which the inner and the outer eccentrics are rotated, the sweep or throw of the outer eccentric being thus constantly varied. The two wheels $g$ and $h$ having an unequal number of teeth and being rotated simultaneously at unequal speeds, it follows that the eccentric driven by the wheel having the lesser number of teeth will be rotated at a quicker speed than, and will overtake, the eccentric driven by the wheel having the greater number of teeth, thus causing the two eccentrics to gradually change their position relatively to each other, as shown in the diagram views, Figs. 6, 7, and 8, and consequently to impart a gradually increasing or decreasing amount of throw or to-and-fro movement to the outer eccentric $l$, and therefore to the rod $p$ and traverse $f$, as hereinbefore stated.

What I claim is—

1. In a machine for preparing and spinning cotton and other fibrous materials, the combination, with a traverse-bar, of two eccentrics, one of which forms a bearing for the other, means for rotating said eccentrics at different speeds, and a connection intermediate the eccentrics and traverse-bar, whereby said traverse is driven by the combined action of said eccentrics, substantially as described.

2. In a machine for preparing and spinning cotton and other fibrous materials, the combination, with a traverse-bar, of two eccentrics, one of which rotates around a fixed axis and itself forms the axis or bearing for the other or outer eccentric, means for rotating said eccentrics at different speeds, and an eccentric strap and rod connecting said outer eccentric with said traverse-bar, substantially as described, for the purpose set forth.

3. In a machine for preparing and spinning cotton and other fibrous materials, the combination, with a traverse-bar, of two eccentrics, one of which forms a bearing for the other or outer eccentric, worm-gearing arranged to rotate said eccentrics at different speeds, and a connection intermediate the outer eccentric and said traverse-bar, substantially as described, for the purpose specified.

4. In a machine for preparing and spinning cotton and other fibrous materials, the combination, with a traverse-bar, of two eccentrics $k$ and $l$, arranged one within the other, toothed wheels $h$ $g$, having an unequal number of teeth and arranged to drive said eccentrics $l$ and $k$, respectively, at different speeds, a worm $i$, for rotating said toothed wheels, a strap $o$, encircling said eccentric $l$, and a connecting-rod $p$ between said strap and traverse-bar, substantially as described, for the purpose set forth.

In testimony whereof I have signed my name to this specification in the presence of two subscribing witnesses.

GEORGE PALEY.

Witnesses:
 JAMES WHITESIDE,
 YATES W. BOOTH.